(12) United States Patent
Spencer et al.

(10) Patent No.: US 7,522,605 B2
(45) Date of Patent: Apr. 21, 2009

(54) DATA PACKET HANDLING IN COMPUTER OR COMMUNICATION SYSTEMS

(75) Inventors: Anthony Spencer, Nr. Wotton under Edge (GB); Ken Cameron, Stoke Gifford (GB)

(73) Assignee: Clearspeed Technology PLC, Bristol (GB)

(*) Notice: Subject to any disclaimer, the term of this patent is extended or adjusted under 35 U.S.C. 154(b) by 525 days.

(21) Appl. No.: 10/534,308

(22) PCT Filed: Nov. 11, 2003

(86) PCT No.: PCT/GB03/04854

§ 371 (c)(1),
(2), (4) Date: Jul. 18, 2005

(87) PCT Pub. No.: WO2004/045160

PCT Pub. Date: May 27, 2004

(65) Prior Publication Data

US 2005/0246452 A1    Nov. 3, 2005

(30) Foreign Application Priority Data

Nov. 11, 2002  (GB) ................................ 0226249.1

(51) Int. Cl.
*H04L 12/28* (2006.01)
(52) U.S. Cl. ....................................... 370/394; 370/412
(58) Field of Classification Search .................. 370/394, 370/412
See application file for complete search history.

(56) References Cited

U.S. PATENT DOCUMENTS

| 5,956,340 | A | 9/1999 | Afek et al. | |
|---|---|---|---|---|
| 6,396,843 | B1 | 5/2002 | Chiussi et al. | |
| 6,829,218 | B1 * | 12/2004 | Chen et al. | 370/230 |
| 6,907,041 | B1 * | 6/2005 | Turner et al. | 370/412 |
| 6,993,027 | B1 * | 1/2006 | Kadambi et al. | 370/394 |
| 2002/0036984 | A1 | 3/2002 | Chiussi et al. | |

OTHER PUBLICATIONS

International Preliminary Examination Report of PCT/GB2003/04854 dated Feb. 3, 2005.
International Search Report of PCT/GB2003/04854 dated Sep. 13, 2004.
Rexford, J., et al., "Hardware-Efficient Fair Queuing Architectures for High-Speed Networks," Proceedings of IEEE Infocom 1996, Conference on Computer Communications, vol. 2, Conf. 15, pp. 638-646, Mar. 24, 1996, San Francisco, California.

* cited by examiner

*Primary Examiner*—Chirag G Shah
*Assistant Examiner*—Otis L Thompson, Jr.
(74) *Attorney, Agent, or Firm*—Potomac Patent Group PLLC

(57) ABSTRACT

The ordering of packet flows, comprising sequences of data packets, in a communication or computer system, is performed by assigning an exit number to each packet; queuing the packets in a buffer; and outputting the queued packets in a predetermined order according to an order list determined by the exit numbers assigned to each packet before it was queued. The exit number information is preferably assigned to packet records, which are queued in a separate buffer to the packets, the records being of fixed length and shorter than the data portions. The packet record buffer comprises groups of bins, each bin containing a range of exit numbers, the bins for higher exit number packet records having a larger range than bins for lower exit number packet records. Lower exit number packet records in a bin are subdivided into a plurality of bins, each containing packet records corresponding to a smaller range of exit numbers. Secondary bins may be created to temporarily store records assigned to a bin that is currently being emptied. The bins may be filled by a parallel processor, preferably a SIMD array processor.

24 Claims, 3 Drawing Sheets

DATA PACKET HANDLING IN COMPUTER OR COMMUNICATION SYSTEMS

FIELD OF THE INVENTION

The present invention is concerned with one of the aspects of data packet handling, such as data packet management in a computer system or traffic management in a communications network, namely order list management. The invention comprises a network processor incorporating the invention, a method of implementing the invention and components incorporating the invention.

BACKGROUND TO THE INVENTION

There are many aspects of control and management of information transmitted across a computer or telecommunications network, over and above the comparatively simple concept of traffic routing. These involve topics more concerned with the relationship between the network provider and the customer, such as cost, quality or level of service, priority and so on.

It is widely expected that the Internet will be reinvented as a converged packet-based platform for new services, delivering all forms of digital material into all types of application domain. This "Intelligent Internet" will need to differentiate between the needs of different traffic streams and allocate resources appropriately to meet those needs. In addition to considerable administrative support across the network, three principal Traffic Management mechanisms are required on the data fast path through the network routers. These are traffic classification, conditioning and handling.

Routers already determine where to send packets. Classification must additionally identify how packets should be treated as they are forwarded, the so-called Class of Service (CoS). A Conditioner then checks that each traffic stream complies with the terms of its Service Level Agreement (SLA). The SLA is a contract that specifies limits on the rates at which a customer is permitted to send traffic in different service classes. Finally, the Handler ensures that service guarantees are met by the provider. Typically, this is achieved through implementing a queue per available CoS. Each queue receives a prescribed quota of link bandwidth and packet buffer space.

As Traffic Management is something of a moving target, with new standards and improved algorithms constantly emerging, a programmable solution is considered to be a high priority. One problem facing engineers is how to design a programmable architecture with a useful processing cycle budget per packet at 40 Gbits/s line rates.

This may be illustrated by reference to FIG. 1, which shows a very simplified schematic diagram of part of the traffic handling portion of a network. The illustrated mechanism includes, in sequence, a traffic classifier A, traffic conditioner B, traffic handling system C and switch fabric S. Block C need not be located physically as in FIG. 1 but may be positioned before or after the switch fabric S. It is expected that data packets will be of varying size, ranging between 40 bytes, 1.5 kbytes, 9 kbytes and up to 16 kbytes.

The traffic classifier Block A has no facility for allocating bandwidth, charging and so on. Its main function is the identification of the class of service that a packet should receive. This typically involves a lookup operation, whereby a number of fields from the packet headers that can uniquely identify the packet with a microflow or flow aggregate are matched according to rules in a lookup table.

The traffic conditioner Block B performs a supervisory role in that it may decide that a customer is using too much bandwidth (say) and may mark that customer's packets with a corresponding marking. This is called "colouring" and the allocated markings may be, for example, "red", "yellow" or "green". Billing statistics may also be performed here and it may take account of the colouring applied to that packet or groups of packets.

The traffic conditioner enforces policy, which is specified in Traffic Conditioning Agreements (TCAs) between a network service provider and its customer. The TCA, which often forms part of the broader SLA, specifies agreed limits to traffic profiles entering (or leaving) the service provider network. Generally speaking, conditioners are therefore located in the boundary nodes of independently administered domains. Policy enforcement requires mechanisms which meter traffic streams to ensure that they comply with the terms of the TCA. "Out-of-profile" streams, ie those stepping outside the bounds of the TCA, may have excess traffic dropped—a measure referred to as policing. Alternatively, marking the packets as indicated above may be regarded as more acceptable. Marked packets may subsequently be discriminated against in the event of downstream traffic congestion.

The traffic handling system Block C decides when and how to put packets into an output buffer and to pull them out for onward transmission via the output port O/P of the illustrated section. Where the line rate is 40 Gbps, packet transmission rate is of the order of 100,000,000 packets per second and the rate at which packets are queued in the buffer ranges between 100s to 1,000s of Megabytes per second. It is the traffic handler which queues traffic and then applies scheduling and shaping mechanisms to forward it according to the required class of service. Scheduling disciplines ensure that traffic streams are protected from one another, that the link is shared fairly between streams, that performance bounds on guaranteed service traffic are met, and that congestion in the network is controlled.

At each stage, statistics may be gathered for administrative purposes The scope of traffic management also encompasses some other important administrative elements, such as policy management, system configuration, statistics processing, reporting, accounting and billing.

The functions performed by blocks A, B, and C are ideally carried out at line rate, for example at 40 Gbps. In the situation where C precedes S, it may not be possible to draw packets out of C into the switch fabric S at the line rate. Huge amounts of memory are therefore necessary to queue packets so as to come as close to the ideal as possible. As an aid to this process, C keeps records of packets rather than the packets themselves. These records are preferably of fixed size and contain information about the packets, which, of course, are themselves of variable size.

Where the system attempts to put packets into the line at a rate that is greater than the line rate (a condition known as "overspeed") block C has to decide which packets are kept and which are held back or discarded. Block B monitors usage and attempts to provide individual customers with their agreed bandwidth but on an averaging basis. It will tolerate transient increases over the agreed bandwidth so long as the average is not exceeded over a given time period. In contrast, block C monitors the actual usage.

In traffic handling, packets may be placed in one of a number of queues. With more than one queue present, a scheduling function must determine the order in which packets are served from the queues. Control of this function is what is meant in this specification by "Order List Management". The scheduled order is determined principally by the relative priorities that the scheduler places on the queues—not on the order in which packets arrived at the queues. The scheduling function is thus fairly serial in character.

For example, consider the two popular scheduling methods:

Fair Queue scheduling—every packet in the queue is given a finish number, which indicates the relative point in time that the packet is entitled to be outputted. The function that serves packets from the queue must identify the queue whose next packet has the smallest finish number. Ideally only after the packet has been served and the next packet in the same queue has been revealed can the dequeueing function make its next decision.

Round Robin scheduling—Queues are inspected in turn in a predetermined sequence. On each visit a prescribed quota of data may be served.

The fundamental problem is how to perform such scheduling algorithms at high speeds. A serialised process can only scale with clock/cycle frequency, or by increasing the depth of the processing pipe which makes the scheduling decision. This approach may only be able to provide a couple of system clock cycles per packet.

On top of this, the scheduling and queue management task is further confounded by a requirement for a large number of potentially very deep queues. Hardware, which executes the scheduling function in a serial manner, is then likely to be highly customised and therefore inflexible if it is to meet the required performance.

SUMMARY OF THE INVENTION

In its broadest interpretation, the invention, in all its aspects, provides a system for maintaining ordered logical data structures in software at high speeds. The inventive aspects per se are set out below:

In a first aspect, the invention provides a method for handling packet flows, comprising sequences of data packets, in a communication or computer system, the method comprising: assigning an exit number to each said packet; queuing said packets in buffer means; allocating said exit numbers to storage bins, each bin accepting a respective range of orders of exit numbers; and outputting the queued packets in a predetermined order according to an order list determined by said exit numbers assigned to said packets before said packets are queued; the method characterized by the step, before said outputting step, of sorting the contents of a bin containing a first range of exit numbers into a plurality of bins each containing a smaller range of exit numbers, the bins for higher order exit number packet records having a larger range than bins for lower order exit number packet records, and wherein said queuing step comprises placing packet records, each record containing information about its respective packet, together with their respective exit numbers in said bins.

In a second aspect, the invention provides a data manager for handling packet flows, comprising sequences of data packets, in a communication or computer system, the system comprising: assigning means for assigning an exit number to each said packet; buffer means for queuing said packets; a series of storage bins; allocating means for allocating said exit numbers to said storage bins together with packet records, each record containing information about its respective packet, each bin accepting a respective range of orders of exit numbers, the bins for higher order exit number packet records having a larger range than bins for lower order exit number packet records; and output means for outputting the queued packets in a predetermined order according to an order list determined by said exit numbers assigned to said packets before said packets are queued; the system characterised by sorting means upstream of said output means for sorting the contents of a bin containing a first range of exit numbers into a plurality of bins each containing a smaller range of exit numbers.

Exit number information is preferably assigned to packet records which are queued in a separate buffer means to that in which said packets are queued. The packet records are preferably of fixed length and shorter than said packets.

Lower exit number packet records in a bin are preferably subdivided into a plurality of bins, each containing packet records corresponding to a smaller range of exit numbers.

Where a packet record is assigned an exit number corresponding to a bin that is currently being emptied, that packet record may be held in a secondary bin of the same exit number for emptying after the said bin that is currently being emptied.

The bins may be FIFO buffers, LIFO stacks or a mixture of both.

The queue management is preferably carried out by (a) processing all of the bins in parallel and inserting incoming data into a bin by means of a parallel processor, preferably a SIMD processor.

The invention also includes a communication network processor, means for sorting data in a computer system and a parallel processor, structured to perform the above method.

BRIEF DESCRIPTION OF THE DRAWINGS

The invention will now be described with reference to the following drawings, in which.

DETAILED DESCRIPTION OF THE ILLUSTRATED EMBODIMENTS

Introduction

Figure 1:
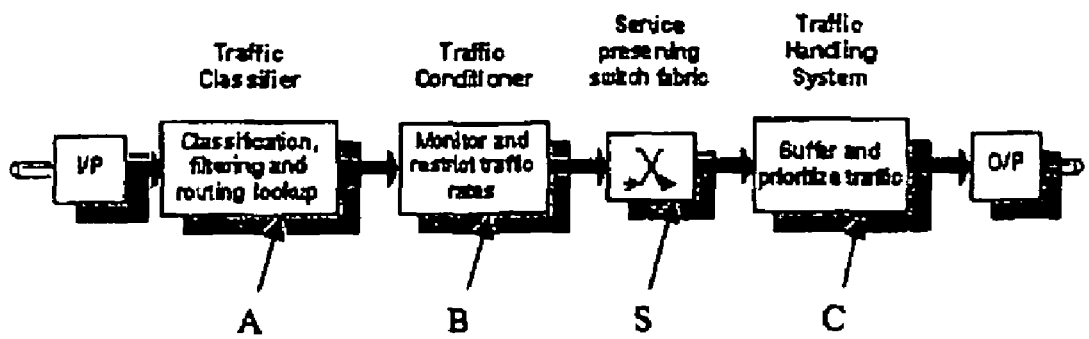
FIG. 1 is a schematic representation of an ideal traffic handling mechanism.

A third approach to scheduling, in accordance with the invention, is to maintain a single, fully ordered queue instead of multiple FIFO queues. In other words, rather than buffer packets in a sat of parallel input queues and then schedule them in some sequence into an output queue, packets are sorted on arrival directly into the output queue.

In comparison with the Fair Queue and Round Robin scheduling approaches, calculations must be made at wire speed for each packet prior to enqueueing but packets must be inserted into a potentially huge ordered data structure. Packet removal is simplified.

However, this approach enables parallelism to be exploited in the implementation of the solution. When performance can no longer be improved through brute force in a serialised solution, the way forward is to find an approach that can scale up through its parallelism.

In a preferred implementation, the present invention is able to take advantage of parallel processing architectures which can provide a sufficient number of processing cycles per packet to enable the calculation of the finish number (ie the number that determines the exit time of the packet) to be made at wire speed for packets as they arrive from the switch fabric. This invention also provides a solution to the maintenance of a large orderlist at high speed.

Each SIMD processor in an array can be used to multiply the amount of parallel processing power and can provide storage in each processor element (PE) in a way that will be described later.

Switch fabrics route packets from multiple source ports to each destination port, causing transient bursts of packets at a rate which exceed the egress line rate of a linecard. The excess packets must be temporarily stored during such bursts. At high line rates, both the rate of packet storage and the storage volume must be very high. Typically 120 Gbits/s aggregate data bandwidth into a 500 Mbyte memory is required at 40 Gbits/s line rates. More importantly, random access to this memory demands a number of independently addressable channels and consequently a large number of pins on device packages. A viable memory sub-system can be realized by using low-pincount, high-speed serial links to dedicated memory hubs. The hubs then provide multiple channels of high volume rapid access memory technology such as Fast Cycle RAM (FCRAM) or Rambus. This is an effective method for balancing device pincounts across the system architecture.

As access to packet content is not required in traffic handling, packets can be streamed directly to the memory hubs. Small records of packet meta-data are then processed, and are used to represent packets in the logical queues. Congestion avoidance (Random Early Detect) and scheduling (Fair Queuing) algorithms typically required for traffic handling are implemented in software by a suitably configured MTAP processing system.

The stream of packet records through the Traffic Handler is quite different in nature to the stream of packets experienced by the Classifier and Conditioner. Packet records are usually smaller than the packet itself and can be of fixed size and the rate of throughput may be very high during packet bursts from the switch fabric.

High throughput inevitably reduces the cycle budget for processing. One of the strengths of a coherent, parallel approach is its ease of scalability. Using the Classifier architecture for comparison, the number of PEs per processor or the number of MTAP processors per chip is increased to meet the required processing cycle count per packet record at the higher speeds. The implied increase in required silicon area can be countered by significantly reducing the per-PE memory to accommodate the relatively small packet records.

Description of the Concept and Invention

Figure 2:
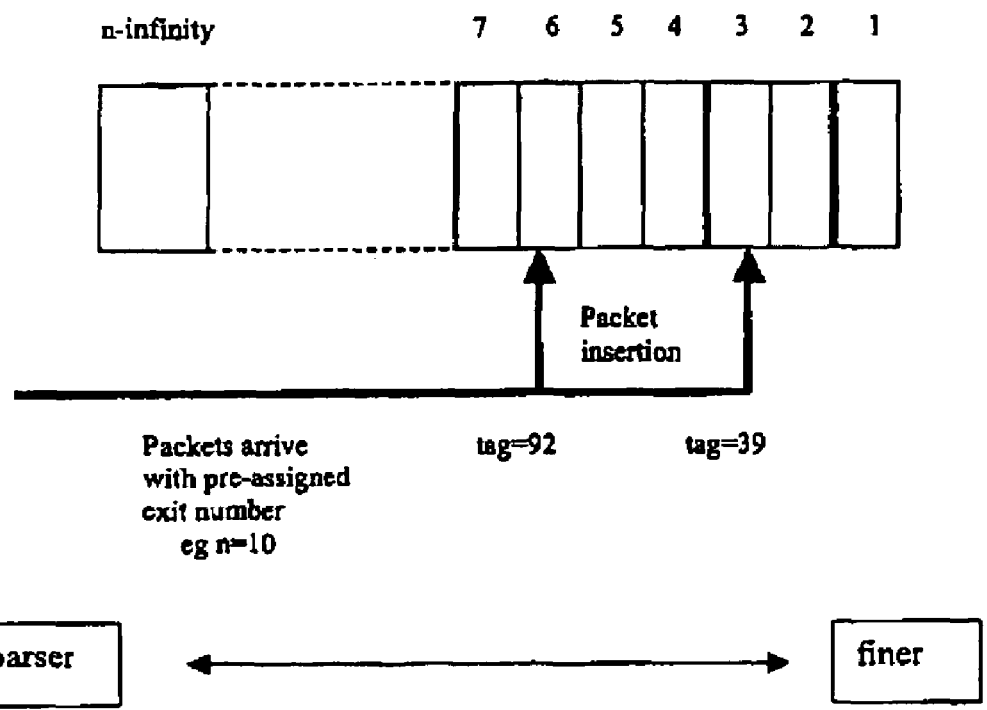
FIG. 2 illustrates the principles of the invention.

Consider first FIG. 2, which shows the basic concept of bin sorting. Coarser bin sorting is indicated to the left and finer bin sorting to the right. Each bin contains records of packets with a range of exit numbers, except for the bin for exit number 1. For the sake of illustration, the bin for exit numbers 2 and 3 is marked in heavier lines to indicate that this is one bin. Packet records of exit numbers 4 to 7 may be put into another bin, also marked by solid lines in FIG. 2. The bins for higher exit numbers generally accommodate a larger range of exit numbers than the bins for lower exit numbers. However, the content of a bin is not ordered.

A function is required which receives packets and places them in the appropriate bin. Another function is required which reads the content of each bin in turn in ascending order of the finish number ranges. This stage of the process produces a stream of packets in a coarsely sorted order, depending on bin range. These then go into a further set of bins with smaller ranges. The process is repeated until the stream is fully sorted.

Assume that just as bins are emptied at one end of this sequence, new bins are installed at the other as packets arrive with finish numbers that are, on average, constantly increasing in value. Bins are created as necessary as lower exit number bins are emptied.

Figure 3:
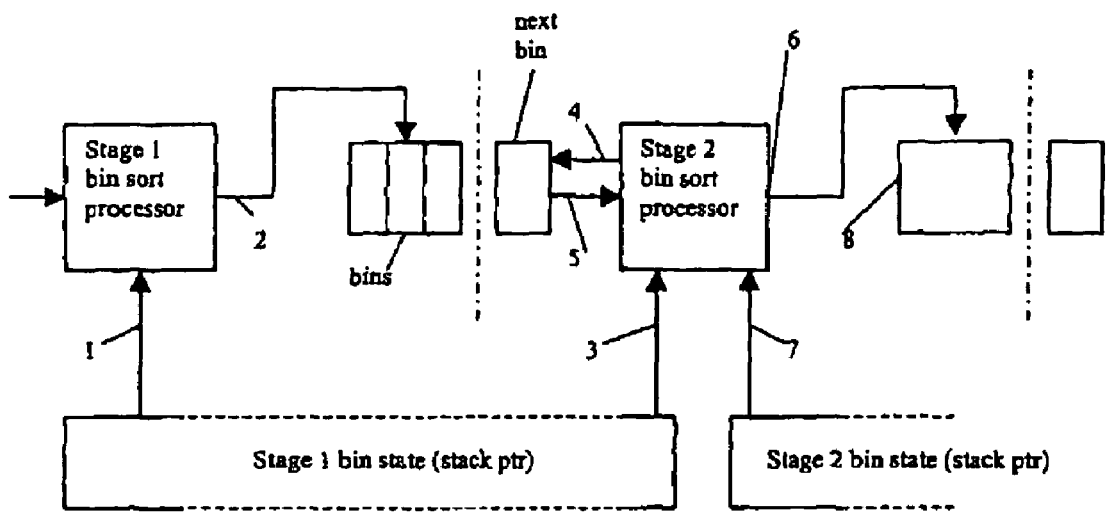
FIG. 3 is a functional overview of a system employing the invention.

FIG. 3 shows an approach that applies the concept embraced by the present invention. The numbering shows the sequence of events as packets arrive, state is accessed, and packets are binned etc. The iterative nature of the bin sorting procedure is indicated by the two illustrated stages. Each bin could be implemented as a FIFO queue or LIFO stack in memory or a combination of both. Such data structures may be managed by pointers that locate the insertion and removal points for data to/from the structure. The functions that operate on the bins need access to these pointers. The functions could be mapped into processors and the pointers into a state memory.

The data structure comprises more than one set of bins. Within a set of bins the finish number range is constant but, between sets, the ranges become progressively smaller as the exit numbers become smaller. Bins with the widest range have the largest finish number values and bins with the smallest range have the smallest finish number values. For example, the total range of finish numbers across all bins in one set may equate to the range of a single bin in an adjacent set.

When a bin is emptied, it is sorted into the next set of bins. Either this is repeated until the finish number range of the final set of bins is unity or when the smallest bins are emptied they are subject to a final sort before forwarding in order.

Details of the Embodiment

Figure 4:
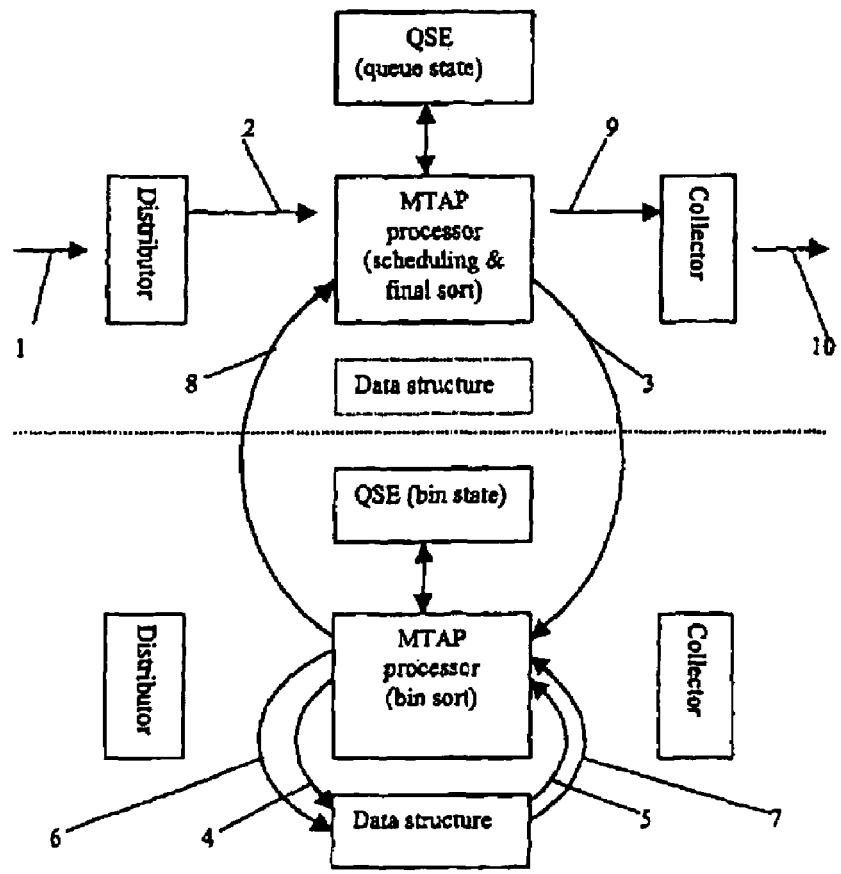
FIG. 4 shows an implementation of the invention using MTAP processors and state engines.

FIG. 4 shows how MTAP processors can be used to implement an orderlist manager. The numbering shows the sequence of events that occur as packets are scheduled, binned, re-binned, sorted and output etc. When MTAP processors are arranged in a data flow processing architecture they are well suited to the processing of a high speed stream of packets. They naturally operate by performing batch reads of data, performing some processing, and then outputting data onto queues.

State Engines used as hardware accelerators can enable the MTAP processors to store and manage the logical state required for the bins. The bins are most conveniently implemented as LIFO stacks. This minimises the required state per bin, and simplifies the management of bins as linked lists in memory. When each packet is stored in a bin its location is retained in the state engine. This can be used as a pointer by the next packet that needs to be written to the same bin. Each bin is thus a stack in which each entry points to the next one down.

A databuffer block is used to store the bins. The block contains a bin memory and presents producer and consumer interfaces to the processor. The consumer receives a stream of packets and simply writes them to a supplied address. The producer receives batch read requests from the procesor and outputs data from the requested bin. As each bin is organised as a linked list, it is the responsibility of the producer to extract the linked list pointer from each packet as it is read from the bin. Using SRAM the access time should be fast enough to make this serialised process efficient.

In a real system embodiment it is not necessary to store the actual packets in the bins. As previously mentioned, records, which represent information about the packets, can be processed in their place. This simplifies implementation as the bins can now store entities (records) which are usually, but not necessarily, of smaller size than the packets and can be of fixed size.

As an aid to understanding the inventive approach, reference will now be made to FIGS. 5 and 6. Consider the situation where the finish number of packets dictates the storage location in a buffer and hence the order in which packets are read from memory and passed to the line output O/P. Data packets are allocated to "flows" on the basis of a number of parameters including, but not limited to, their origin, destination, Class of Service, cost and nature, such as video or Internet Protocol (IP). These flows can then be allocated "high", "medium" and "low" priority in the order in which they are managed. Billing can then be implemented on a per flow basis. Clearly, a strategy is required for deciding which packets are to be taken from which queue at what time.

This management criterion can be effected by assigning to each packet, a tag representing an exit time or number, based on the parameters set for billing purposes. The packets will therefore be stored in the buffers in order of exit time or number. This "number" could represent either the assigned exit time or the exit number in a required sequence. No "intelligence" is then required in the system for pulling out packets in the required order since that order has already been set in the storage phase.

The exit time order may conveniently be managed by storing those packets having similar exit times or numbers in the same storage bin. However, it is not necessary that each exit time or number should have a dedicated storage bin. It may be sufficient for the bins to accommodate packets in order. This is illustrated schematically in FIG. 5, where packets having exit time or number order 1 are placed in one bin, those with order 2 and 3 are out together in another bin 3-2, those with order 4 to 7 are put together in another bin 7-4 and so on, up to order 1,000 if need be. In order to cope with exit times or numbers in excess of the highest numbered bin currently in use, the end bin can be designated n to infinity. As numbers greater than n enter that bin, the range within that bin can itself be subdivided so that, in future, the end bin could be renamed as 10n to infinity. This process could be repetitive.

It is important to appreciate that the order number of only the packet records, rather than the packets themselves, need be stored in this way. There are potentially huge savings in this approach since the records can be of fixed length and therefore take up a known, predetermined allocation in a storage bin, in contrast to the far greater and variable size of the packets themselves. Moreover, when the invention is implemented by means of a series of parallel MTAP processors, as previously mentioned, each record can be handled by a respective Processing Element (PE) of an MTAP processor. In this way, a single clock cycle can enjoy the benefits of say 64 cycles of processing time, because of the parallel architecture of MTAP processors operating under Single Instruction Multiple Data (SIMD) conditions.

Figure 5:
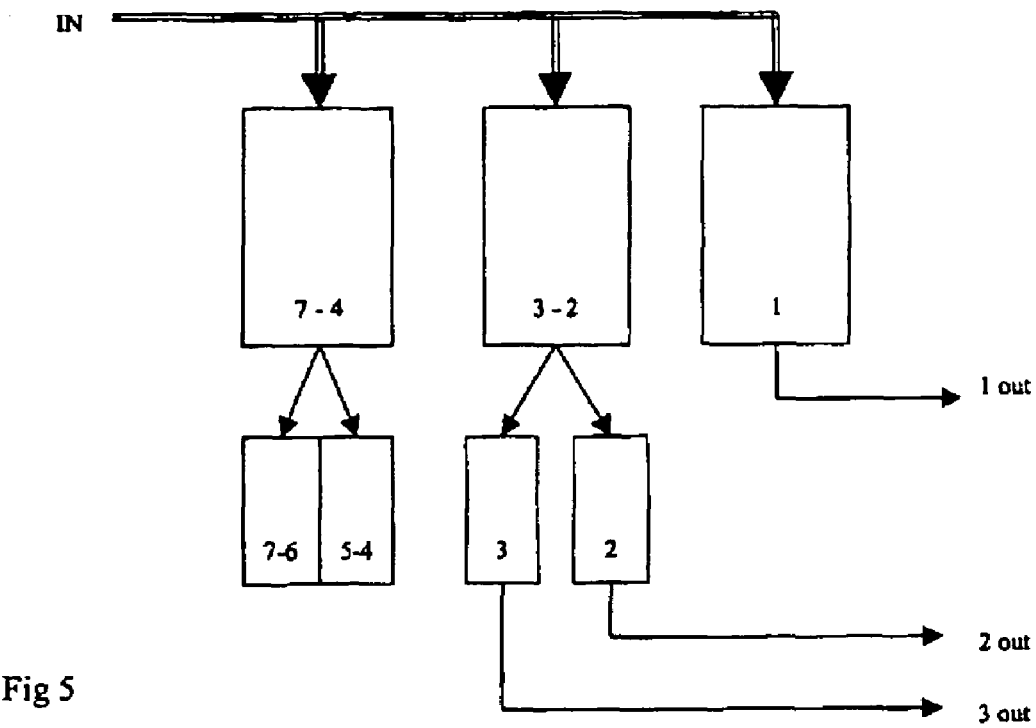
FIG. 5 is a schematic representation of the way in which order lists are handled.
Figure 6:
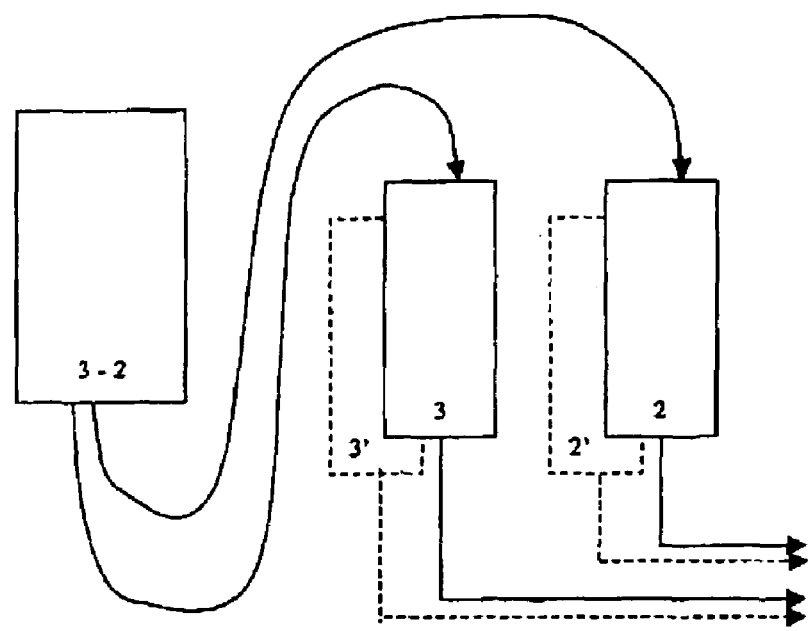
FIG. 6 shows how sub-divided order lists are managed.

Reverting to FIG. 5, and considering, for example, the situation as regards the position for packet records with mixed exit orders 2 and 3, the parallel processor can separate the list for the order 2 or 3 records into a respective list for each of order 2 and order 3. Similarly, the list for order numbers 4 to 7 can be coarsely split into respective order lists for order numbers 4 and 5 (bin 5-4) and for order numbers 6 and 7 (bin 7-6). These coarse lists will eventually be broken down into finer lists in the same way as for the combined order list for finish orders 2 and 3. The process for the finer breakdown of this order list is illustrated schematically in FIG. 6.

As shown, the combined order list for 2 and 3 is broken down into separate order lists respectively for order 2 and for order 3. At the same time, packet records in list 1 can be read out to extract the corresponding packet from buffer store and pass it to the line O/P device. Once list 1 has been emptied, the manager moves to empty from previously sorted list 2. If a new record with finish order 2, for example, arrives whilst the combined list 2-3 is being sorted, the new arrival is passed into a second order 2 list (bin 2'), shown in phantom lines in FIG. 6, created for that purpose. This bin 2' for order 2 packet records will be emptied after the previously sorted list for packet records of order 2 has been emptied. The same arrangement applies for new entries of order 3 (bin 3').

The main advantage of implementing the invention on the basis of SIMD architecture is the programmability aspect, rather than having to predicate the number and size of the individual storage bins for each order group, in hardware. A hardware-based approach would necessitate excessively high processor speed and would be far more complex. As previously mentioned, SIMD processing effectively multiplies the number of processor clock cycles, thereby enhancing processor speed proportionately.

Each bin may be either of FIFO type or may be implemented by a stack, of LIFO type. Stacks are advantageous in that they are easier to implement. The fact that they reverse the order in which records are stored is immaterial to the order list management since the splitting of the lists automatically ensures that the packets will exit onto the O/P port in the correct order, according to their originally assigned exit order tag. Packets in the same flow will have different exit numbers, ensuring that their order is maintained.

The number of bins may vary up to around 1,000. There is an inevitable trade-off between the number of bins and the amount of bin/list sorting. Fewer queues require more sorting. The system designer will need to make that decision in the context, inter alia, of the intended application.

In addition, the following criteria may influence the final design of the traffic handler as regards list management:

On-demand load balancing: The processors are split between the enqueueing (scheduling) task and the dequeueing (final sort) task. A sufficient number of processors must be implemented in order that they can cope with the transient worst case rate of packet arrival. However, the nominal arrival rate is much lower. This would mean that a number of processors could routinely lay idle or be underused. In that case, a small number of processors may be assigned permanently to either the enqueueing or dequeueing tasks. The remainder may float. If input congestion is detected then the floating processors thread switch and assist in the enqueueing task. When the congestion is cleared, the floating processors migrate to the dequeueing task and help to clear the backlog in the queues. If dequeuing is well resourced, then floating processors may default to peripheral tasks such as statistics pre-processing for subsequent reporting to the control plane.

Shadowed memory management: This is an important aspect of the orderlist management system. Any given data structure needs functions to read and write entries, logical state to characterise the structure, and underlying memory management to store the structure efficiently. The processor and accelerator only acheive the first two of these. No mention has yet been made of maintaining a freelist of available memory and allocating memory for the data structure to grow into. This in itself can often incur considerable overhead. The efficiency of the orderlist manager is only possible because the memory management has already been performed for it as follows:

Background:

In 40G traffic handling, it is practical to divorce the packet buffering from the processing task. Packets are stored in memory within the packet buffering system. Small records are passed to the processing system, which efficiently manipulates records in place of the packets they represent.

The packet memory is partitioned into small blocks of fixed size. A free list or bitmap is maintained which keeps track of which blocks are allocated and which are free. The bitmap is used by the memory management system to manage memory dynamically. Packets can be streamed directly into memory on arrival from the switch fabric, with the small record of metadata retained for processing Most significantly, the record will contain the memory address of the (first) block of memory in which the packet is stored.

Packet Record Handling and Storage

Packet records are stored in a data structure by the orderlist manager. This requires the existence of two resources—storage for the logical state describing each bin in the structure and storage for the records themselves. State storage and bin manipulation are implemented by the Queue State Engine (QSE) and parallel processors respectively. Bin memory management relies directly on the packet memory management.

Bin Memory Management Concept

The memory provided for record storage is organised so that it mirrors the memory provided for packets. For each memory block in the packet memory there is a corresponding bin in the record store at a directly related memory address.

When a packet is stored, the memory block into which it is placed must be free. The bin in the record memory must also then be free. When the record is scheduled, the memory system recovers the packet and the memory block occupied by that packet is released. Simultaneously, the corresponding record bin is released. Since the storage and retrieval of the packet record is effectively "nested" within the time over which the packet is stored and recovered, the system is very robust.

Use of Pointers:

As records are randomly stored within the record memory, the records belonging to a given bin must point to one another in a linked list arrangement. The record contains the pointer to the packet memory. The pointer also then points to the record's own bin in its memory.

In effect, a record both points to itself and also to its neighbour. The same information is being stored twice. Consider records A and B, which are adjacent in a linked list. Record A has pointer 'Self_A', which is its own bin, and 'Next_A', which is a pointer to the next record in the list (record B). Record B also has 'Self_B' and 'Next_B'. It can be seen that 'Next_A' is the same as 'Self_B'. Only the 'Next' pointer is actually required in each packet. When a bin is read (in order A, B, C . . . ) each record can have its own pointer identity restored by retrieving it from the record before it in the list. This provides a considerable reduction in the record storage requirement.

Ancillary Features:

Two storage systems can share the same memory manager when the write/read accesses to one are nested within the write/read accesses to the other. A record's own pointer identity when it is not stored is interchangeable with a linked list pointer when the record is stored. A translation must occur when the record is passed in and out of storage. The bins may be managed by dedicated algorithms.

The invention claimed is:

1. A method for handling packet flows, comprising sequences of data packets, in a communication or computer system, the method comprising: assigning an exit number to each said packet; queuing said packets in buffer means; allocating said exit numbers to storage bins, each bin accepting a respective range of orders of exit numbers; outputting the queued packets in a predetermined order according to an order list determined by said exit numbers assigned to said packets before said packets are queued; and before said outputting step, of sorting the contents of a bin containing a first range of exit numbers into a plurality of bins each containing a smaller range of exit numbers, the bins for higher order exit number packet records having a larger range than bins for lower order exit number packet records, and wherein said queuing step comprises placing packet records, each record containing information about its respective packet, together with their respective exit numbers in said bins.

2. A method as claimed in claim 1, wherein said sorting step is repeated until the contents of the bins are completely sorted.

3. A method as claimed in claim 1, wherein said queuing step comprises placing each said data packet together with its respective exit number in said buffer means, said buffer means comprising said storage bins.

4. A method as claimed in claim 1, wherein the packet records are of fixed length.

5. A method as claimed in claim 1, wherein the packet records are shorter than said packets.

6. A method as claimed in claim 1, wherein under circumstances in which a packet record is assigned an exit number corresponding to a bin that is currently being emptied, that packet record is held in a specially created secondary bin of the same exit number order for emptying after the said bin that is currently being emptied.

7. A method as claimed in claim 1, wherein the bins are FIFO buffers.

8. A method as claimed in claim 1, wherein the bins are LIFO stacks.

9. A method as claimed in claim 1, wherein the bins are a mixture of FIFO buffers and LIFO stacks.

10. A method as claimed in claim 1, wherein queue management is performed by (a) processing all of said bins in parallel and (b) inserting incoming data into a bin by means of a parallel processor.

11. A method as claimed in claim 10, wherein said parallel processor performing said inserting step (b) is an array processor.

12. A method as claimed in claim 11, wherein said array processor performing said inserting step (b) is a SIMD processor.

13. A method as claimed in claim 1, wherein said sorting step is carried out by a parallel processor.

14. A method as claimed in claim 13, wherein said parallel processor is an array processor.

15. A method as claimed in claim 14, wherein said array processor is a SIMD processor.

16. A data manager for handling packet flows, comprising sequences of data packets, in a communication or computer system, the system comprising: assigning means for assigning an exit number to each said packet; buffer means for queuing said packets; a series of storage bins; allocating means for allocating said exit numbers to said storage bins together with packet records, each record containing information about its respective packet, each bin accepting a respective range of orders of exit numbers, the bins for higher order exit number packet records having a larger range than bins for lower order exit number packet records; and output means for outputting the queued packets in a predetermined order according to an order list determined by said exit numbers assigned to said packets before said packets are queued; the system characterised by sorting means upstream of said output means for sorting the contents of a bin containing a first range of exit numbers into a plurality of bins each containing a smaller range of exit numbers.

17. A data manager as claimed in claim 16, wherein said allocating means comprises a parallel processor.

18. A data manager as claimed in claim 17, wherein said sorting means comprises a parallel processor.

19. A data manager as claimed in claim 17, wherein said parallel processor is an array processor.

20. A data manager as claimed in claim 19, wherein said parallel processor is a SIMD processor.

21. A data manager as claimed in claim 16, wherein said buffer means is adapted to queue said data packets together with their respective exit numbers.

22. A data manager as claimed in claim 16, wherein said buffer means comprises said series of bins, and wherein said bins are adapted to receive packet records, each record containing information about a respective packet, together with the respective exit number, and said buffer means is adapted to queue said packets.

23. A data manager as claimed in claim 16, wherein said sorting means is adapted to repeat sorting said bins until the contents of the bins are completely sorted.

24. A method for handling packet flows, comprising sequences of data packets, in a communication or computer system, the method comprising:

assigning an exit number to each said packet;

queuing said packets in a buffer;

allocating said exit numbers to storage bins, each bin accepting a respective range of orders of exit numbers;

outputting the queued packets in a predetermined order according to an order list determined by said exit numbers assigned to said packets before said packets are queued; and, before said outputting step, sorting the contents of a bin containing a first range of exit numbers into a plurality of bins each containing a smaller range of exit numbers, wherein said queuing step comprises placing packet records, each record containing information about its respective packet, together with their respective exit numbers in said bins; and wherein the bins are a mixture of FIFO buffers and LIFO stacks.

* * * * *